(12) United States Patent
Badyrka et al.

(10) Patent No.: US 8,524,816 B2
(45) Date of Patent: Sep. 3, 2013

(54) COATING RESISTANT TO BIO-DIESEL FUELS

(75) Inventors: Paul Badyrka, Grosse Ile, MI (US);
Thomas T. Haig, Novi, MI (US);
Warren E. Knape, Westland, MI (US);
Gregory Lee Tarrance, Detroit, MI (US)

(73) Assignee: Magni Industries, Inc., Detroit, MI (US)

( * ) Notice: Subject to any disclaimer, the term of this patent is extended or adjusted under 35 U.S.C. 154(b) by 966 days.

(21) Appl. No.: 12/045,372

(22) Filed: Mar. 10, 2008

(65) Prior Publication Data
US 2008/0227897 A1 Sep. 18, 2008

Related U.S. Application Data

(60) Provisional application No. 60/894,995, filed on Mar. 15, 2007.

(51) Int. Cl.
*C08C 19/02* (2006.01)

(52) U.S. Cl.
USPC ........... 524/147; 524/500; 524/405; 524/321; 524/238; 524/280; 524/379; 524/196; 524/157; 524/428; 524/303; 524/414; 524/413; 524/436; 524/451; 524/449; 524/437

(58) Field of Classification Search
USPC ....................................... 524/147
See application file for complete search history.

(56) References Cited

U.S. PATENT DOCUMENTS

| | | | | |
|---|---|---|---|---|
| 3,924,773 A | * | 12/1975 | Wilkinson | 220/88.3 |
| 4,544,581 A | | 10/1985 | Pelloski | |
| 4,719,036 A | * | 1/1988 | Clubley et al. | 252/391 |
| 5,047,451 A | | 9/1991 | Barrett et al. | |
| 5,290,840 A | | 3/1994 | Hegedus et al. | |
| 5,389,219 A | * | 2/1995 | Zwack et al. | 204/486 |
| 5,637,156 A | | 6/1997 | Kubota et al. | |
| 5,859,095 A | * | 1/1999 | Moyle et al. | 523/402 |
| 5,859,135 A | * | 1/1999 | Doomen et al. | 525/123 |
| 6,361,881 B1 | * | 3/2002 | Izaki et al. | 428/626 |
| 6,777,464 B1 | * | 8/2004 | Watanabe et al. | 523/457 |
| 7,057,264 B2 | | 6/2006 | Wang et al. | |
| 2004/0137166 A1 | | 7/2004 | Nishiguchi et al. | |
| 2004/0167271 A1 | * | 8/2004 | Maeyama et al. | 524/513 |
| 2005/0161641 A1 | * | 7/2005 | Gros | 252/500 |
| 2006/0078740 A1 | * | 4/2006 | Zern et al. | 428/411.1 |
| 2006/0121327 A1 | * | 6/2006 | Keller et al. | 429/30 |

FOREIGN PATENT DOCUMENTS

| | | | |
|---|---|---|---|
| EP | 0 381 125 | | 8/1990 |
| JP | 05-009410 | * | 1/1993 |

OTHER PUBLICATIONS

Machine translation of JP 05-009410.*
Machine translation of JP 05-009410, Jan. 1993.*
Shamrock Technologies, Inc., product brochure for SST-3 Slip/Abrasion Resistance, Feb. 24, 2006, p. 1 of 1.
Wacker Polymer Systems GMBH & Co., Pioloform—Polyvinyl Butyrals, Product Brochure, pp. 1-26.

(Continued)

*Primary Examiner* — Doris Lee
(74) *Attorney, Agent, or Firm* — Reising Ethington P.C.

(57) ABSTRACT

One embodiment of the invention includes a product including a coating comprising (a) a primary resin and a blocked isocyanate, and (b) at least one bio-diesel fuel degradation product neutralizing material.

67 Claims, 3 Drawing Sheets

(56) References Cited

OTHER PUBLICATIONS

Sachtleben Chemie GMBH, Product Information, Sachtoperse Pastes, Great Solutions With Small Particles, 2 pages, Duisburg, Germany.

R. T. Vanderbilt Company, Inc., Industrial Minerals and Chemicals, product information, Specification VANTALC 6H, 1 page.

Buckman Laboratories, Inc., Busan 11-M1 Multifunctional Pigment, When You Need the Confidence that Years of Proven Performance Can Offer, 1995 Buckman Laboratories, 12 pages.

Aerosil R9200, Hydrophobic Fumed Silica, Product Information, degussa. creating essentials, Jul. 2005, 2 pages.

Tego Airex 986, Product Data Sheets, deaerator for solvent-based and solvent-free coating systems, Jul. 2003, 1 page.

Elementis Specialties, Bentone SD-3, Rheological Additive With Improved Dispersibility for Non-Polar to Medium-Polarity Media, General Information, Oct. 2006, 2 pages.

BYK Chemie, Acrylate Leveling Additives for Solvent-Based and Powder Coatings, Data Sheet S8, Jun. 2003, 4 pages.

BYK Chemie, Substance for Success, Wetting and Dispersing Additives for Solvent-Borne Systems, Data Sheet W215, Dec. 2005, 4 pages.

Glenn Springs Holdings, Inc., Phosphorus and Phosphorus Derivatives, Ferrophos Pigment, company brochure, Apr. 30, 2002, 4 pages.

BYK Chemie, Member of Altana Chemie, Substance for Success, Technical Information L-NI1, Nanotechnology Additives, 8 pages.

Baxenden Chemicals Limited, Specialty Chemicals Division Blocked Isocyanates, product brochure, 6 pages.

Great Lakes Polymer Additives, Technical Information, Lowinox DLTDP Thiosynergist Antioxidant, Technical Service EMEA, 1 page.

R.T. Vanderbilt Company, Inc., Vanderbilt Technical Data, VANTALC 6H-II, 4 pages.

Internet article, Sachtoperse: Barium sulfate nano-particles for PCB coatings, Sachtoperse HU-N-LP, Jan. 5, 2007, 2 pages.

Technical Data Bulletin, TECH0002, InChemRez Phenoxy Resin Solutions, InChemRez PKHS-40, & -30PMA, Comparative Coatings Studies vs. EPONOL 53 & EPONOL 55, Oct. 1995, 2 pages.

Zemex Industrial Minerals, Inc., Suzorite 400-HK, 1 page.

Tego Airex 986, deaerator for solvent-based and solvent-free coating systems, Product Data Sheet, Aug. 2003, 1 page.

Elements Specialties, Bentone SD-3, rheological additive, now with improved dispersibility, DS-521, Apr. 1993, 2 pages.

Internet article, Sachtoperse: Barium sulfate nano-particles for high-end coatings, Jan. 7, 2007, 2 pages.

\* cited by examiner

COATING RESISTANT TO BIO-DIESEL FUELS

This application claims the benefit of U.S. Provisional Application No. 60/894,995, filed Mar. 15, 2007.

TECHNICAL FIELD

The field to which the disclosure generally relates includes coatings, particularly coatings resistant to bio-diesel fuels, products having such coatings thereon, and methods of making and using the same.

BACKGROUND

Many processes in coatings have been developed for protecting metal substrates, and particularly carbon steel substrates, from both direct and electrochemical corrosion. Previously, metal substrates have been protected in varying degrees by applying organic and metal coatings such as phosphate, paint, plastic resins, zinc, lead, stainless steel, aluminum and the like. Heretofore, coated metal substrates have been utilized for storing and handling various combustible fuels. Numerous coatings have been utilized to provide chemical resistance for metal substrates. Chemical resistant coatings have been applied to tank interiors to protect against gasoline. However, with the development of alternative fuels, protecting such metal substrates from corrosion has become a much more challenging task.

One alternative fuel known as bio-diesel includes mono alkyl esters of long chain fatty acids derived from renewable biological sources. Bio-diesel can be manufactured from a variety of renewable sources such as vegetable oils, recycled cooking oils, animal fats, and tall oil from wood pulp waste. Common sources for bio-diesel include soybeans, rapeseed, jatropha nuts, coconuts, palm trees and the like. Based upon the feed stock, bio-diesel may be referred to as FAME fatty acid methyl ester (collective term for bio-diesel), for example, CME-coconut methyl ester, RME-rapeseed methyl ester, and SME soybean methyl ester. The designation Bxx is used to refer to the percentage of FAME blended with petroleum based diesel fuel. For example, B2 means that 2% FAME is blended with diesel fuel; B20 means that 20% FAME is blended with diesel fuel; and B100 means 100% FAME. Bio-diesel is of interest because it can be used to run existing diesel engines and can be distributed using current distribution infrastructure. Bio-diesel reduces hydrocarbon emissions and has positive performance attributes, for example increased cetane. The domestic production of bio-diesel provides energy security from a renewable source.

However, it has been discovered that bio-diesel fuel degradation products are extremely corrosive, and typical coatings used on combustible fuel storage and handling equipment are insufficient to prevent corrosion of the materials of construction of such equipment.

SUMMARY OF EXEMPLARY EMBODIMENTS OF THE INVENTION

One embodiment of the invention includes a product including a coating comprising (a) the reaction product of a primary resin and a blocked isocyanate, and (b) at least one bio-diesel fuel degradation product neutralizing material.

Another embodiment of the invention includes a coating composition including a phenoxy resin, a blocked isocyanate, and a bio-diesel fuel constituent neutralizing material.

Another embodiment of the invention includes a coating composition comprising a phenoxy resin, a blocked isocyanate, and a polyvinyl acetal.

In another embodiment, the polyvinyl acetal comprises a polyvinyl butyral.

Another embodiment of the invention includes a product comprising a cured coating comprising the reaction product of a phenoxy resin, a blocked isocyanate, and a polyvinyl acetal.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings which illustrate selected embodiments and are not meant to limit the scope of the appended claims, wherein:

DETAILED DESCRIPTION OF EXEMPLARY EMBODIMENTS

Figure 1:
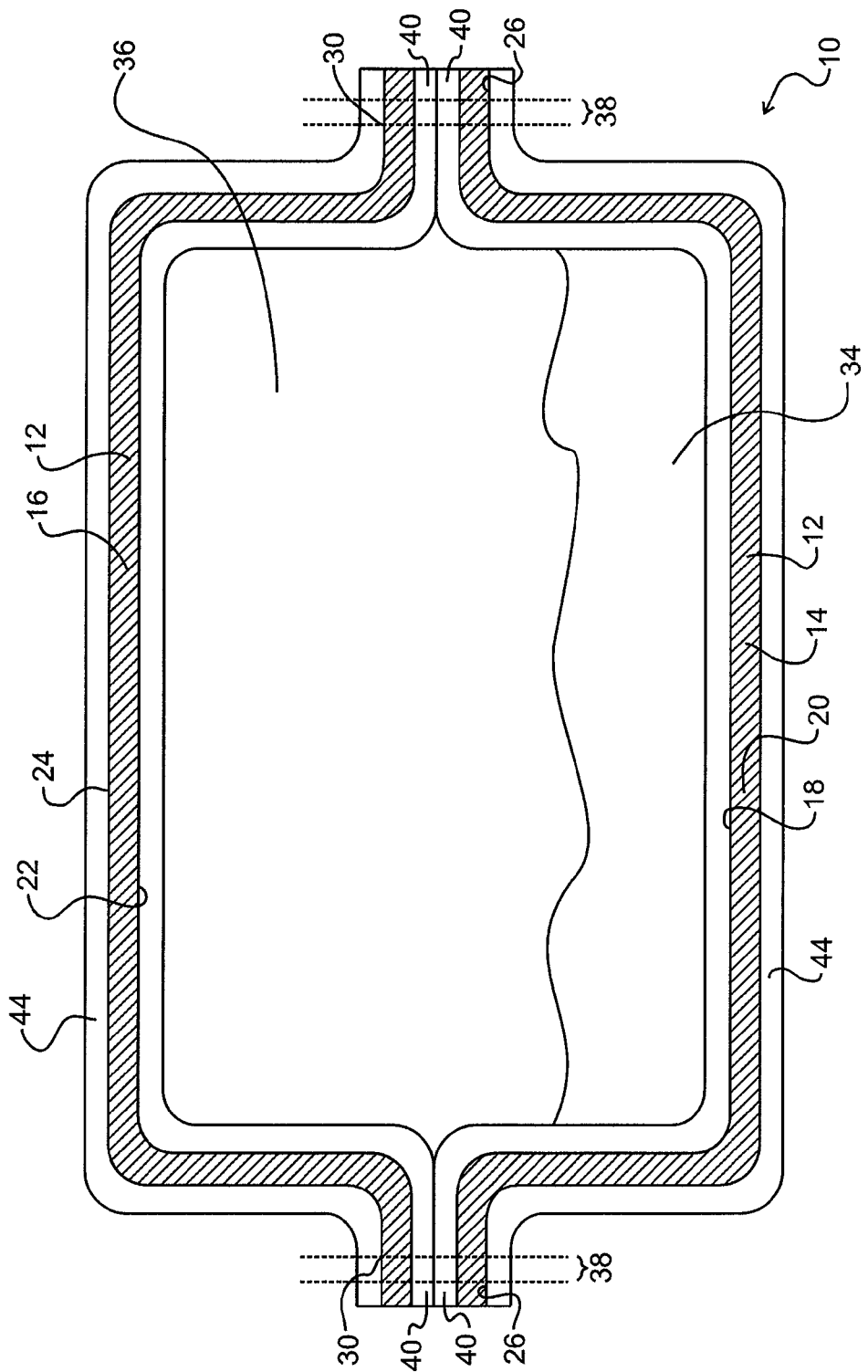
FIG. 1 is a sectional view of a portion of a fuel tank for a vehicle including a welded substrate with a cured coating over at least an inner surface of the tank according to one embodiment of the invention.

The following description of the embodiment(s) is merely exemplary in nature and is in no way intended to limit the invention, its application, or uses.

One embodiment of the invention includes a coating composition comprising a blocked isocyanate or blocked isocyanate prepolymer, a primary resin reactable with the isocyanate, and a secondary resin also reactable with the isocyanate. The coating composition includes a solids phase and a liquid phase. In one embodiment of the invention, the primary resin is a phenoxy resin which may have an average molecular weight, as determined by Gel Permeation Chromatography with the appropriate column based upon narrow distribution polystyrene standards, ranging from about 10,000 to about 100,000; or from about 30,000 to about 90,000; or from about 50,000 to about 80,000; or from about 60,000 to about 68,000; and most preferably about 64,000 (Mw/Mn (average) 64,000/28,600, wherein Mw is the weight average molecular weight and Mn is the number average molecular weight). The phenoxy resin may have a viscosity ranging from about 6000-15000 cP (Brookfield at 25° C. 30% in propylene glycol methyl ether acetate (PMA). The primary resin may be present in about 5 to about 90 weight percent (wt %) of the solid phase. A suitable phenoxy resin is available from InChem Corp., of Rock Hill, S.C. under the trade name PKHS-30HP. A phenoxy resin is a high molecular weight thermoplastic polyether resin based upon bisphenol-A and epichlorohydrin which may have bisphenol-A terminal groups. Other suitable primary resin materials may include, but are not limited to, epoxies, polyesters, urethanes, or acrylics.

In one embodiment of the invention, the secondary resin may be a polyvinyl butyral. Such a polyvinyl butyral may be formed by the polymerization of vinyl acetate followed by saponification to polyvinyl alcohol. Thereafter, the polyvinyl alcohol is reacted with a butyral-dehyde. The polyvinyl butyral may have an average molecular weight ranging from about 10,000 to about 350,000; from about 40,000 to about 200,000; or from about 85,000 to about 125,000. A suitable polyvinyl butyral is available from Wacker Polymer Systems GmbH & Company, Burghausen, Germany under the trade name BT18. Other suitable secondary resins may include, but are not limited to, polyesters, epoxies, polyvinyldene fluoride, or urethanes. The secondary resin may be present in about 0.1 to about 70 wt % of the solids phase.

In one embodiment, the composition may include a blocked isocyanate or blocked isocyanate prepolymer. In one embodiment, the composition includes a dimethylpyrazole blocked isocyanate, most preferably, methylethylketoxime blocked isocyanate. Such a blocked isocyanate may have an unblocking range of about 140-160° C. The isocyanate may have an equivalent weight ranging from about 50 to about 1,000. The isocyanate may be present in about 0.1 to about 80 wt % of the solids phase. Preferably the blocked isocyanate is a toluene diisocyanate (TDI). However, any of a variety of other isocyanate monomers may be utilized, including, but not limited to, 4,4'-diphenylmethane diisocyanate (MDI) or xylene diisocyanate (XDI). Other isocyanate monomers include hexamethylene diisocyanate (HDI), isophorone diisocyanate (IPDI), dicyclohexyl MDI ($H_{12}$MDI), tetramethyl-m-xylidene diisocyanate (TMXDI), 2,2,5-trimethylhexane diisocyanate (TMHDI) and prepolymers thereof. Blocked isocyanate prepolymers may also be utilized. Examples of suitable blocking groups include 3,5-dimethylpyrazol, oxime, methylethylketoxime, e-caprolactam, nonylphenol, diethyl malonate, diisopropylamine (DIPA), t-butyl benzyl amine (DEBA), 2-formyloxyethyl methylacrylate, methanol, t-butanol, n-butanol, 1,2,4-triazole, propylene glycol, isopropanol, n-hexanol, hydroamic ester, acetoacetonate ester, n-pentanol, n-hydroxysuccimide, tris(alkoxycarbonylamine)triazine (TACT), flourine, 2-formylethyl methacrylate, and/or 1,2-propane diol. Commercially available blocked isocyanates are available from Baxenden Chemicals, Ltd., Lancashire, England, under the product numbers BI 7642, 7770, 7772, 7779, 7950, 7951, 7961, 7981, 7986, and 7990, and the like.

In another embodiment of the invention, the composition may include a primary resin, secondary resin and/or additional polymers or resins that may include, but are not limited to, epoxy, phenoxy, polyester, vinyl, phenolic, amino, isocyanates including blocked isocyanates, silicone, polyurethane, alkyd, polyvinyl, glycidyl including epoxy and carbamate, triazine including phenolic, imido phenolic, bis-maleimide, dicyandiamide, titanate, fluorinated, chlorinated, phthalate, synthetic rubber, silicate, hydrocarbon, bituminous, cellulosic, hydroxyalkylamide, acetoacetylated, polyaziridine, polycarbodiimide, rubber, nylon-based materials, acrylic, polyaniline, polypyrrole, poly(ethylene-dioxthiophene), polythiopenes, poly(p-phenylene vinylene), polyetheramines and/or electrically conductive resins.

According to another embodiment of the invention, the coating composition may also include at least one neutralizing agent for neutralizing at least one bio-diesel degradation product. In one embodiment of the invention, a first neutralizing agent is provided which may be a pH buffer to neutralize organic acids present in the bio-diesel fuel. In one embodiment, the first neutralizing agent includes barium. More preferably, the first neutralizing agent includes barium borate or barium metaborate. A suitable first neutralizing agent is available from Buckman Laboratories, Memphis, Tenn., under the trade name BUSAN 11-M1. In one embodiment of the invention, the first neutralizing agent may be present in about 0.5 to 40.0 wt % of the solids phase. Other suitable first neutralizing agents include, but are not limited to, phosphate compounds, citrates, borates, glycine compounds, carbonates, hydroxides, acetate compounds, urea compounds, ammonia, ammonia compounds, ethanesulfonic acid compounds, propanesulfonic acid compounds, and/or amine compounds.

In another embodiment of the invention, a second neutralizing agent may be provided which acts to neutralize peroxides (or hydro-peroxides), decomposes or is a scavenger thereof. In one embodiment, the second neutralizing agent may contain sulfur and, for example, may be a thiosynergist antioxidant. A suitable second neutralizing agent may be di-lauryl-3,3'-thiodipropionate. A suitable second neutralizing agent is available from Great Lakes Polymer Additives, West Lafayette, Ind., under the trade name LOWINOX DLTDP. LOWINOX DLTDP decomposes and neutralizes peroxides. In one embodiment of the invention, the second neutralizing agent may be present in amount ranging from about 0.25 to about 30 wt % of the solids phase. Other suitable second neutralizing agents may include, but are not limited to, hydride compounds, borohydrides, phosphites, urea compounds, thiourea compounds, hydrazine compounds, hydrosulfites, sulfites, bisulfites, dextrose, sorbitol, aldehydes, magnesium, oxime, ketoximes, ferricyanides, lindlar catalyst, oxalic acid, hypophosphite compounds, boranes, chromium compounds, indium compounds, 3-mercaptopropionic acid, neodym, silane compounds, samarium compounds, formate compounds, strontium compounds, titanium compounds, zinc compounds, magnesium compounds, phosphine compounds, iodoacetamide, vanadocene, hydroxylamine, erythorbic acids and salts, phenolic compounds, electrides, anhydrides, naphthalides, phosphonium compounds, tertiary butylhydroquinone (TBHQ), butylated hydroxyanisole, butylated hydroxytoluene, ascorbates, including acids and esters, and/or isoascorbics.

In another embodiment of the invention, the composition may include barium metaborate as an antimicrobile, for example, but not limited to, in an amount range from about 0.5 to about 40 weight percent of the dry coating film.

In another embodiment of the invention, the composition may include electrically conductive particles in an amount sufficient to allow substrates coated with the cured coating composition to be welded together. In one embodiment, the electrically conductive particles include a ferrous-based pigment, including but not limited to a pigment including at least one of iron phosphide (FeP) or diiron phosphide ($Fe_2P$). In one embodiment, a ferrous-based pigment may comprise about 18 to about 39 percent FeP and about 49 to about 62 percent $Fe_2P$. A suitable ferrous-based pigment is available from Glenn Springs Holding, Inc., Lexington, Ky., under the trade name FERROPHOS pigment. Other suitable electrically conductive particles include, but are not limited to, nickel, carbon black, graphite or electrically conductive nanoparticles. The electrically conductive particles may be present in the coating composition in amount ranging from about 0.25 to about 35 wt % of the solids phase.

In one embodiment of the invention, the primary resin, secondary resin, blocked isocyanate and electrically conductive particles are selected so that the coating composition may be applied to a substrate so that the substrate can be drawn and welded into a product, such as a fuel tank. The coating must remain attached to the substrate as it is stretched during the drawing operation to form a fuel tank.

In another embodiment of the invention, particles are added to the coating composition to enhance the barrier properties and reduce the permeability of the cured coating to corrosive agents such as organic acids and peroxides. In one embodiment, the barrier properties of the cured coating are enhanced by utilizing a trimodal particle size distribution. In one embodiment of the invention the trimodal particle size distribution includes a first group of micron size particles, a second group of submicron particles, and a third group of nanoparticles. In one embodiment, the micron size particles may be present in about 0.25 to about 50 wt %, the submicron particles may be present in about 0.1 to about 40 wt %, and the nanoparticles may be present in about 0.05 to about 30 wt % of the solids phase. In another embodiment, the micron size particles may be present in about 1 to about 20 wt %, the submicron particles may be present in about 1 to about 5 wt %, and the nanoparticles may be present in about 0.1 to about 5 wt % of the solids phase.

In another embodiment of the invention the bimodal particle shape distribution includes a first group of particles having a platelet or near-platelet shape and a second group of particles having a spherical or near-spherical shape. In one embodiment, the nanoparticles include alumina ($Al_2O_3$). The alumina particles may be in nanoparticle size. The alumina particles are resistant to organic acids and peroxides. Suitable nanoparticles are available from BYK-Chemie GmbH, Wesel, Germany, under the product name BYK-LP X 20693. Other suitable nanoparticles include, but are not limited to silicon, carbides, metal oxides, ceramic particles, aluminum compounds, silica compounds, silicone compounds, calcium compounds, talc, mica, gold compounds, iron compounds, molybdenum compounds, nickel compounds, nobium compounds, platinum compounds, silver compounds, tantalum compounds, titanium compounds, tungsten compounds, zinc compounds, barium compounds, cerium compounds, chromium compounds, cobalt compounds, copper compounds, dysprosium compounds, erbium compounds, gadolinium compounds, holmium compounds, indium compounds, lanthanum compounds, lithium compounds, magnesium compounds, neodymium compounds, praseodymium compounds, samarium compounds, strontium compounds, terbium compounds, tin compounds, yttrium compounds, ytterbium compounds, zirconium compounds, and/or carbon compounds. The particles may include rods, spheres, cubes, tubes, cones, clusters, dendrimers, block copolymers, polymers, metallopolymers, nanotetrapods, and nanocomposites.

Suitable spherical-shaped submicron particles may include barium sulfate particles. A suitable spherical-shaped submicron particle is available from Sachtleben GmbH, Duisburg, Germany under the product designation SACHTOPERSE HU-N-LP. Suitable micron size particles may include mica platelets and talc platelets. A suitable mica platelet is available from Zemex Corporation, Atlanta, Ga., under the product designation SUZORITE 400-HK. Suitable talc platelets are available from R.T. Vanderbilt Company, Inc., Norwalk, Conn., under the product designation VAN-TALC 6H.

The composition may include a lubricating agent such as polytetrafluorethylene (PTFE) or waxes. The PTFE may be in the form of particles having a size equal to about 1-100 microns; 1-600 microns; 1-20 microns; or 5-100 nanometers. The coating composition may include a quantity of PTFE lubricating agent equal to about 0.25 to 60% by weight of the total solids, preferably 0.5 to 10%, and most preferably 1 to 4%. A suitable PTFE particle is available from Shamrock Technologies, Inc., Newark, N.J., under the product designation SST-3.

The liquid phase of the composition may include a variety of components including, but not limited to, aromatic solvents, propylene glycol methyl ether acetate, dibasic esters, methyl ethyl ketone, glycol ethers, low molecular weight polycarboxylic acids, and/or polymethacrylates. Suitable dispersion additives may include, but are not limited to, anionic surfactants, nonionic surfactants, cationic surfactants, amphoteric surfactants, polymers including block copolymers, random copolymers, "comb" copolymers (also known as comb-branched copolymers), and/or polymeric hyperdispersants (or superdispersants). The liquid phase to solid phase weight ratio may range from about 9.5:0.5 to about 0:10. One example of a comb copolymer is Ethacryl® P dispersants (available from Lyondell Chemical Company, Houston, Tex.), which are water-soluble, polycarboxylate copolymers with a comb-branched structure.

Additional components may include bentonite clay and hydrophobic fumed silica and/or silica. In one embodiment, the coating composition may include an anti-foaming agent so that a cured coating made there from is a non-foam coating substantially free of bubbles, open cells, and closed cells. In another embodiment, the coating composition includes a defoaming agent, such as but not limited to an organic polymer combined with silicone, such as Airex 986. In various other embodiments, the defoaming agent may be acrylates, acrylic copolymers, silica/wax copolymer blend, fatty acids/alcohol blend, ethylene glycol/propylene glycol copolymer blend, hydrocarbons, mineral oil/silicon blend, mineral oils, polymers, polyether/siloxane copolymer, silica/silicone copolymer, silica, silicones, siloxanes, waxes, other organics, phosphates, and/or other silicon-free defoamers.

In use a thin wet film of a coating composition is applied to a metal substrate and then cured to a dry chemical-resistant protective coating. If desired, the viscosity of the coating composition can be reduced by adding compatible solvents. The thin wet film of the composition may have a thickness ranging from about 40 μm to about 64 μm when applied to the metal substrate. Thereafter, the thin wet film is heated to a temperature sufficient to unblock the isocyanate(s); to cause the unblocked isocyanate(s), primary resin, and secondary resin to cross-link; to drive off the liquid phase of the composition thereby drying the film; and to provide a cured coating bonded to the substrate. The thickness of the dried and cured coating may range from about 7.6 μm to about 10.2 μm.

Suitable substrates include, but are not limited to, any quality steel or steel alloy, any zinc-plated or zinc alloy-plated substrate, any tin-plated or tin alloy-plated substrate, aluminum or aluminum alloys.

According to one embodiment of the invention, a simulated bio-diesel fuel tank was formed including a substrate and a cured coating over the substrate, with the cured coating comprising (a) the reaction product of a phenoxy resin, polyvinyl butyral, and a methylethylketoxime blocked toluene diisocyanate, and (b) the cured coating further comprising a pH buffer comprising at least one of barium borate or barium metaborate, a neutralizing agent comprising di-lauryl-3,3'-thiodipropionate, electrically conductive particles comprising at least one of FeP or $Fe_2P$, and a trimodal particle size distribution of barrier particles comprising talc platelets, mica platelets, barium sulfate, and alumina. The cured coating faced the cavity of the simulated fuel tank. Bio-diesel fuel was carried in the simulated fuel tank for over 70 days at 65° C. without any signs of corrosion. In comparison, a simulated fuel tank having an inner coating of epoxy showed signs of corrosion in less than 14 days at 65° C. when continuously exposed to bio-diesel fuel.

One embodiment of the invention is illustrated in FIG. 1 which is a sectional view of a bio-diesel fuel tank 10 including a substrate 12, which may include but is not limited to aluminum or steel. The substrate 12 may include a first shell 14 and a second shell 16. The first shell 14 may include a first face 18 and a second face 20. The second shell 16 may include a first face 22 and a second face 24. A cured coating 40 according to one embodiment of the invention is over the first face 18 of the first shell 14 and over the first face 22 of the second shell 16. The first shell 14 may have a first flange 26. The second shell 16 may have a second flange 30. The first flange 26 of the first shell 14 may be welded to the second flange 30 of the second shell, and the cured coating 40 may be therebetween. In one embodiment, the cured coating 40 in a weld area 38 may flow away from the weld joint. Bio-diesel fuel 34 may be carried in the cavity 36 of the fuel tank 10 and may include degradation products including organic acids, peroxides, aldehydes and/or hydro-peroxides. A cured coating 44 according to one embodiment of the invention is over the second face 20 of the first shell 14 and over the second face 24 of the second shell 16.

Figure 2A:
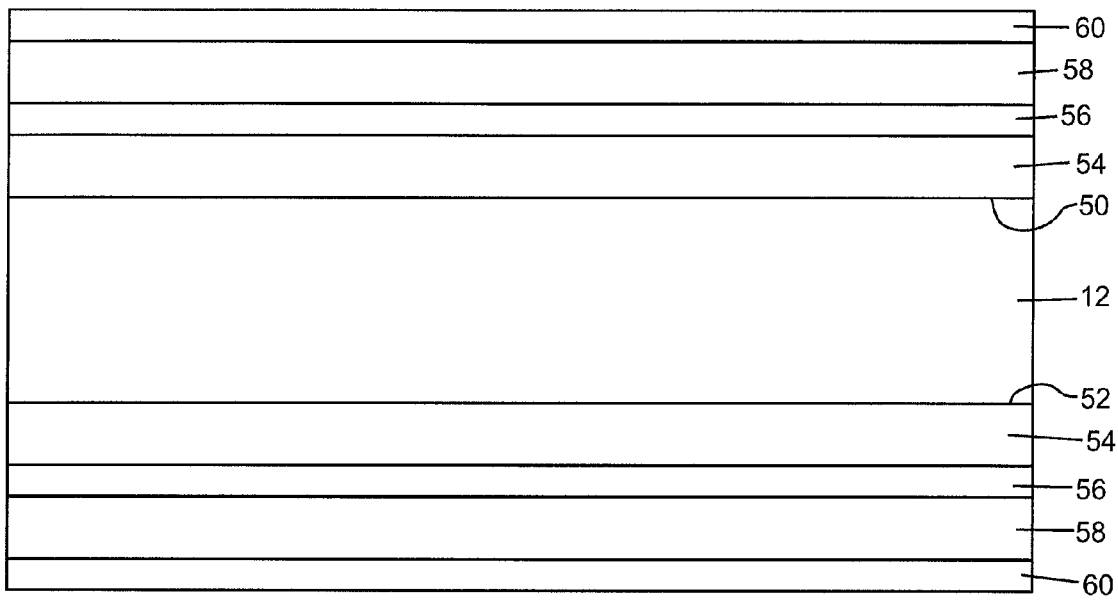
FIG. 2A is a sectional view of a substrate with a cured coating according to one embodiment of the invention.

FIG. 2A illustrates a sectional view of another embodiment including a substrate 12, which may include but is not limited to aluminum or steel, and one or more layers interposed between the substrate and a cured coating. The substrate 12 has a first face 50 and a second face 52. A tin-zinc, tin, Galfan®, Galvalume®, zinc-nickel, galvanneal, or aluminized coating 54 may be over the first face 50 and the second face 52. A pretreatment 56 may be over the zinc-nickel or Galvanneal or aluminized coating 54. The pretreatment 56 may comprise, but is not limited to, chrome-free cobalt oxide (Bonderite®) and chrome-free titanium oxide (Parcolene®), both available from Henkel Surface Technologies, Madison Heights, Mich. A cured coating 58 may be over the pretreatment 56. A water-soluble dry film lubricant 60 may be over the cured coating 58.

Figure 2B:
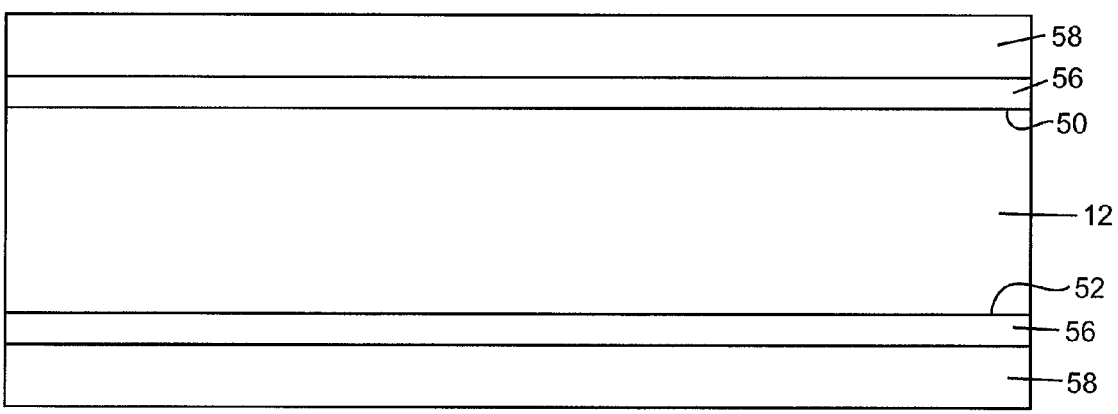
FIG. 2B is a sectional view of a substrate with a cured coating according to another embodiment of the invention.

FIG. 2B illustrates a sectional view of another embodiment including a substrate 12, which may include but is not limited to aluminum or steel, and one or more layers interposed between the substrate and a cured coating. The substrate 12 has a first face 50 and a second face 52. A pretreatment 56 may be over the first face 50 and the second face 52. The pretreatment 56 may comprise, but is not limited to, chrome-free cobalt oxide (Bonderite®) and chrome-free titanium oxide (Parcolene®), both available from Henkel Surface Technologies, Madison Heights, Mich. A cured coating 58 may be over the pretreatment 56.

Figure 3:
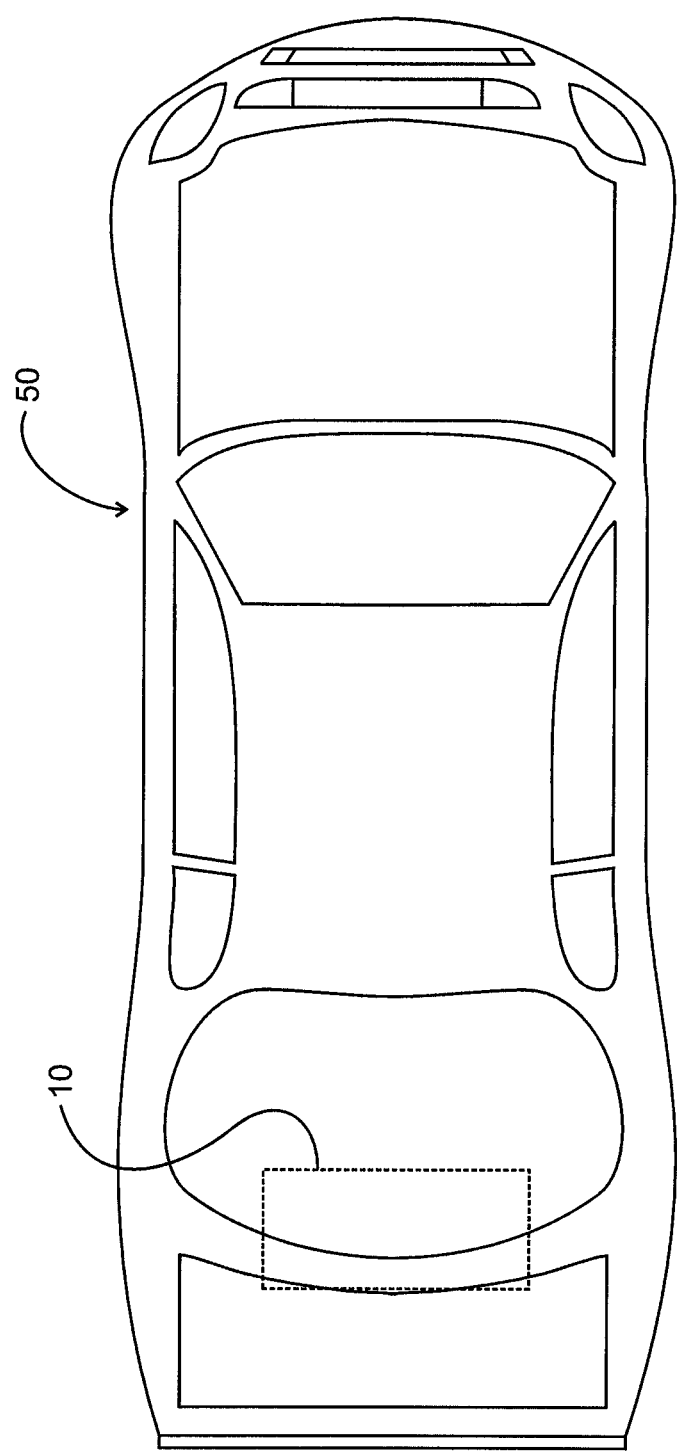
FIG. 3 illustrates a vehicle with a fuel tank having a protective coating on an inner surface thereof according to one embodiment of the invention.

FIG. 3 illustrates a vehicle 62 with a fuel tank 10 having a protective coating on an inner surface thereof according to one embodiment of the invention.

When the terms "over", "overlying", "overlies" or the like are used herein with respect to the relative position of layers to each other, such shall mean that the layers are in direct contact with each other or that another layer or layers may be interposed between the layers.

The above description of embodiments of the invention is merely exemplary in nature and, thus, variations thereof are not to be regarded as a departure from the spirit and scope of the invention.

What is claimed is:

1. A coating composition comprising a solids phase comprising: (a) a primary resin and a blocked isocyanate, and (b) a first bio-diesel fuel degradation product neutralizing agent comprising at least one of phosphate compounds, citrates, borates, glycine compounds, carbonates, hydroxides, acetate compounds, urea compounds, ammonia, ammonia compounds, ethanesulfonic acid compounds, propanesulfonic acid compounds or amine compounds, and further comprising a second bio-diesel fuel degradation product neutralizing agent comprising a peroxide or hydro-peroxide neutralizing, decomposing or scavenging material, wherein the coating composition is formulated so that when cured the cured coating has a resistance to corrosion by bio-diesel fuel wherein the first bio-diesel fuel degradation product neutralizing agent is present in about 0.5 to about 40.0 wt % of the solids phase, wherein the second bio-diesel fuel degradation product neutralizing agent is present in about 0.25 to about 30.0 wt % of the solids phase, further comprising a trimodal size distribution of particles comprising a first group of micron size particles, a second group of submicron particles, and a third group of nanoparticles, or a bimodal particle shape distribution comprising a first group of particles having a platelet or near-platelet shape and a second group of particles having a spherical or near-spherical shape and an iron based pigment.

2. A coating composition as set forth in claim 1 wherein the first bio-diesel fuel degradation neutralizing agent comprises at least one of barium borate or barium metaborate.

3. A coating composition as set forth in claim 1 wherein the second bio-diesel fuel degradation product neutralizing agent comprises a sulfur compound.

4. A coating composition as set forth in claim 1 wherein the second bio-diesel fuel degradation product neutralizing agent comprises a thiosynergist antioxidant.

5. A coating composition as set forth in claim 1 wherein the second bio-diesel fuel degradation product neutralizing agent comprises di-lauryl-3,3'-thiodipropionate.

6. A coating composition as set forth in claim 1 wherein the second bio-diesel fuel degradation product neutralizing agent comprises at least one of hydride compounds, borohydrides, phosphites, urea compounds, thiourea compounds, hydrazine compounds, hydrosulfites, sulfites, bisulfites, dextrose, sorbitol, aldehydes, magnesium, oxime, ketoximes, ferricyanides, lindlar catalyst, oxalic acid, hypophosphite compounds, boranes, chromium compounds, indium compounds, 3-mercaptopropionic acid, neodym, silane compounds, samarium compounds, formate compounds, strontium compounds, titanium compounds, zinc compounds, magnesium compounds, phosphine compounds, iodoacetamide, vanadocene, hydroxylamine, erythorbic acids and salts, phenolic compounds, electrides, anhydrides, naphthalides, phosphonium compounds, tertiary butylhydroquinone (TBHQ), butylated hydroxyanisole, butylated hydroxytoluene, ascorbates, including acids and esters, or isoascorbics.

7. A coating composition as set forth in claim 1 wherein the primary resin is present in about 5 to about 90 wt % of the solids phase.

8. A coating composition as set forth in claim 1 wherein the primary resin comprises at least one of epoxy, phenoxy, polyester, vinyl, phenolic, amino, isocyanates including blocked isocyanates, silicone, polyurethane, alkyd, polyvinyl, glycidyl including epoxy and carbamate, triazine including phenolic, imido phenolic, bis-maleimide, dicyandiamide, titanate, fluorinated, chlorinated, phthalate, synthetic rubber, silicate, hydrocarbon, bituminous, cellulosic, hydroxyalkylamide, acetoacetylated, polyaziridine, polycarbodiimide, rubber, nylon-based materials, acrylic, polyaniline, polypyrrole, poly(ethylene-dioxthiophene), polythiopenes, poly(p-phenylene vinylene), or other electrically conductive resins.

9. A coating composition as set forth in claim 1 wherein the blocked isocyanate has an equivalent weight ranging from about 50 to about 1,000.

10. A coating composition as set forth in claim 1 wherein the blocked isocyanate is present in about 0.1 to about 80 wt % of the solids phase.

11. A coating composition as set forth in claim 1 wherein the blocked isocyanate comprises a methylethylketoxime blocked isocyanate.

12. A coating composition as set forth in claim 1 wherein the blocked isocyanate comprises at least one of toluene diisocyanate (TDI), 4,4'-diphenylmethane diisocyanate (MDI), xylene diisocyanate (XDI), hexamethylene diisocyanate (HDI), isophorone diisocyanate (IPDI), dicyclohexyl MDI ($H_{12}$MDI), tetramethyl-m-xylidene diisocyanate (TMXDI), or 2,2,5-trimethylhexane diisocyanate (TMHDI) or prepolymers thereof.

13. A coating composition as set forth in claim 1 wherein the blocked isocyanate comprises a blocking group comprising one of 3,5-dimethylpyrazol, oxime, methylethylketoxime, e-caprolactam, nonylphenol, diethyl malonate, diisopropylamine (DIPA), t-butyl benzyl amine (DEBA), 2-formyloxyethyl methylacrylate, methanol, t-butanol, n-butanol, 1,2,4-triazole, propylene glycol, isopropanol, n-hexanol, hydroamic ester, acetoacetonate ester, n-pentanol, n-hydroxysuccimide, tris(alkoxycarbonylamine)triazine (TACT), flourine, 2-formylethyl methacrylate, or 1,2-propane diol.

14. A coating composition as set forth in claim 1 wherein the micron size particles are present in about 0.25 to about 50 wt %, the submicron particles are present in about 0.1 to about 40 wt %, and the nanoparticles are present in about 0.05 to about 30 wt % of the solids phase.

15. A coating composition as set forth in claim 1 further comprising a lubricating agent.

16. A coating composition as set forth in claim 1 further comprising a dispersion additive comprising at least one of anionic surfactants, nonionic surfactants, cationic surfactants, amphoteric surfactants, polymers including block copolymers, random copolymers, comb copolymers, or polymeric hyperdispersants (or superdispersants).

17. A coating composition as set forth in claim 1 wherein the composition comprises an antifoaming agent so that a cured coating made therefrom is a non-foam coating substantially free of bubbles, open cells, and closed cells.

18. A coating composition as set forth in claim 1 further comprising a secondary resin.

19. A coating composition as set forth in claim 18 wherein the secondary resin is present in about 0.1 to about 70 wt % of the solids phase.

20. A coating composition as set forth in claim 1 further comprising a liquid phase comprising at least one of aromatic solvents, propylene glycol methyl ether acetate, dibasic esters, methyl ethyl ketone, glycol ethers, low molecular weight polycarboxylic acids, or polymethacrylates.

21. A coating composition as set forth in claim 20 wherein the liquid phase to solid phase weight ratio ranges from about 9.5:0.5 to about 0:10.

22. A coating composition as set forth in claim 1 wherein the primary resin comprises a phenoxy resin.

23. A coating composition as set forth in claim 22 wherein the phenoxy resin has an average molecular weight ranging from about 10,000 to about 100,000.

24. A coating composition as set forth in claim 22 wherein the phenoxy resin has an average molecular weight of about 64,000.

25. A coating composition as set forth in claim 1 further comprising a secondary resin comprising a polyvinyl butyral.

26. A coating composition as set forth in claim 25 wherein the polyvinyl butryral has an average molecular weight ranging from about 10,000 to about 350,000.

27. A coating composition as set forth in claim 25 wherein the polyvinyl butryral has an average molecular weight ranging from about 40,000 to about 200,000.

28. A coating composition as set forth in claim 1 further comprising a lubricating agent comprising polytetrafluoroethylene.

29. A coating composition as set forth in claim 28 wherein the polytetrafluoroethylene is in the form of particles having a size of about 1-600 microns.

30. A coating composition as set forth in claim 28 wherein the polytetrafluoroethylene is in the form of particles having a size of about 5-100 nanometers.

31. A coating composition as set forth in claim 28 wherein the polytetrafluoroethylene is present in about 0.25 to about 60 wt % of the solids phase.

32. A coating composition as set forth in claim 1 further comprising an electrically conductive material comprising at least one of electrically conductive particles or an electrically conductive resin in an amount so that the cured coating of the composition does not impede welding.

33. A coating composition as set forth in claim 32 wherein the electrically conductive resin comprises at least one of polyaniline, polypyrrole, poly(ethylene-dioxthiophene), polythiopenes, or poly(p-phenylene vinylene).

34. A coating composition as set forth in claim 32 wherein the electrically conductive particles comprise at least one of FeP or $Fe_2P$.

35. A coating composition as set forth in claim 32 wherein the electrically conductive particles comprise at least one of nickel, carbon black graphite, or electrically conductive nanoparticles.

36. A coating composition as set forth in claim 32 wherein the electrically conductive particles are present in an amount of about 0.25 to about 35 wt % of the solids phase.

37. A product comprising: a substrate and a cured coating over the substrate, the cured coating comprising (a) the reaction product of a primary resin and a blocked isocyanate, and (b) a first bio-diesel fuel degradation product neutralizing agent comprising at least one of citrates, borates, glycine compounds, carbonates, hydroxides, acetate compounds, urea compounds, ammonia, ammonia compounds, ethanesulfonic acid compounds, or propanesulfonic acid compounds, and wherein the substrate is shaped and welded into a bio-diesel fuel tank with the cured coating facing the cavity of the tank, and further comprising a second bio-diesel fuel degradation product neutralizing agent comprising a peroxide or hydroperoxide neutralizing, decomposing or scavenging material.

38. A product as set forth in claim 37 wherein the first bio-diesel fuel degradation product neutralizing agent comprises at least one of barium borate or barium metaborate.

39. A product as set forth in claim 37 wherein the primary resin comprises at least one of epoxy, phenoxy, polyester, vinyl, phenolic, amino, isocyanates including blocked isocyanates, silicone, polyurethane, alkyd, polyvinyl, glycidyl including epoxy and carbamate, triazine including phenolic, imido phenolic, bis-maleimide, dicyandiamide, titanate, fluorinated, chlorinated, phthalate, synthetic rubber, silicate, hydrocarbon, bituminous, cellulosic, hydroxyalkylamide, acetoacetylated, polyaziridine, polycarbodiimide, rubber, nylon-based materials, acrylic, polyaniline, polypyrrole, poly(ethylene-dioxthiophene), polythiopenes, poly(p-phenylene vinylene), or other electrically conductive resins.

40. A product as set forth in claim 37 further comprising a secondary resin.

41. A product as set forth in claim 37 further comprising a secondary resin comprising a polyvinyl butyral.

42. A product as set forth in claim 37 wherein the blocked isocyanate comprises a methylethylketoxime blocked isocyanate.

43. A product as set forth in claim 37 wherein the blocked isocyanate comprises at least one of toluene diisocyanate (TDI), 4,4'-diphenylmethane diisocyanate (MDI), xylene diisocyanate (XDI), hexamethylene diisocyanate (HDI), isophorone diisocyanate (IPDI), dicyclohexyl MDI ($H_{12}MDI$), tetramethyl-m-xylidene diisocyanate (TMXDI), or 2,2,5-trimethylhexane diisocyanate (TMHDI).

44. A product as set forth in claim 37 wherein the blocked isocyanate comprises a blocking group comprising one of 3,5-dimethylpyrazol, oxime, methylethylketoxime, e-caprolactam, nonylphenol, diethyl malonate, diisopropylamine (DIPA), t-butyl benzyl amine (DEBA), 2-formyloxyethyl methylacrylate, methanol, t-butanol, n-butanol, 1,2,4-triazole, propylene glycol, isopropanol, n-hexanol, hydroamic ester, acetoacetonate ester, n-pentanol, n-hydroxysuccimide, tris(alkoxycarbonylamine)triazine (TACT), flourine, 2-formylethyl methacrylate, or 1,2-propane diol.

45. A product as set forth in claim 37 further comprising a bimodal particle shape distribution comprising a first group of particles having a platelet or near-platelet shape and a second group of particles having a spherical or near-spherical shape.

46. A product as set forth in claim 37 further comprising a first group of particles comprising talc platelets, mica platelets, barium sulfate, and alumina.

47. A product as set forth in claim 37 wherein the substrate comprises a first shell and a second shell, and wherein the first shell comprises a first flange, and wherein the second shell comprises a second flange, and wherein the first flange is welded to the second flange.

48. A product as set forth in claim 37 further comprising a bio-diesel fuel carried in the cavity of the tank.

49. A product as set forth in claim 37 wherein the primary resin comprises a phenoxy resin.

50. A product as set forth in claim 49 wherein the phenoxy resin has an average molecular weight ranging from about 50,000 to about 80,000.

51. A product as set forth in claim 37 further comprising a trimodal size distribution of particles comprising a first group of micron size particles, a second group of submicron particles, and a third group of nanoparticles.

52. A product as set forth in claim 51 wherein the micron size particles are present in about 1 to about 20 wt %, the submicron particles are present in about 1 to about 5 wt %, and the nanoparticles are present in about 0.1 to about 5 wt % of the cured coating.

53. A product as set forth in claim 37 further comprising a lubricating agent.

54. A product as set forth in claim 53 further comprising a lubricating agent comprising polytetrafluoroethylene.

55. A product as set forth in claim 37 wherein the first bio-diesel fuel degradation product neutralizing agent comprises barium.

56. A product as set forth in claim 55 wherein the second bio-diesel fuel degradation product neutralizing agent comprises a thiosynergist antioxidant.

57. A product as set forth in claim 55 wherein the second bio-diesel fuel degradation product neutralizing agent comprises di-lauryl-3,3'-thiodipropionate.

58. A product as set forth in claim 55 wherein the second bio-diesel fuel degradation product neutralizing agent comprises at least one of hydride compounds, borohydrides, phosphites, urea compounds, thiourea compounds, hydrazine compounds, hydrosulfites, sulfites, bisulfites, dextrose, sorbitol, aldehydes, magnesium, oxime, ketoximes, ferricyanides, lindlar catalyst, oxalic acid, hypophosphite compounds, boranes, chromium compounds, indium compounds, 3-mercaptopropionic acid, neodym, silane compounds, samarium compounds, strontium compounds, titanium compounds, zinc compounds, magnesium compounds, phosphine compounds, Iodoacetamide, vanadocene, hydroxylamine, erythorbic acids and salts, phenolic compounds, electrides, anhydrides, naphthalides, phosphonium compounds, tertiary butylhydroquinone (TBHQ), butylated hydroxyanisole, butylated hydroxytoluene, ascorbates, including acids and esters, or isoascorbics.

59. A product as set forth in claim 37 further comprising an electrically conductive material comprising at least one of electrically conductive particles or an electrically conductive resin in an amount so that the cured coating of the composition does not impede welding.

60. A product as set forth in claim 59 wherein the electrically conductive resin comprises at least one of polyaniline, polypyrrole, poly(ethylene-dioxthiophene), polythiopenes, or poly(p-phenylene vinylene).

61. A product as set forth in claim 59 wherein the electrically conductive particles comprise at least one of FeP or $Fe_2P$.

62. A product as set forth in claim 59 wherein the electrically conductive particles comprise at least one of nickel, carbon black, graphite or electrically conductive nanoparticles.

63. A product comprising: a substrate and a cured coating over the substrate wherein the substrate is shaped and welded into a bio-diesel fuel tank with the cured coating facing the cavity of the tank, wherein the substrate comprises a first shell and a second shell, and wherein the first shell comprises a first flange, and wherein the second shell comprises a second flange, and wherein the first flange is welded to the second flange, the cured coating comprising (a) the reaction product of a phenoxy resin, polyvinyl butyral, and a methylethylketoxime blocked toluene diisocyanate, and (b) the cured coating further comprising a pH buffer comprising at least one of barium borate or barium metaborate, a bio-diesel degradation product neutralizing agent comprising di-lauryl-3,3'-thiodipropionate, electrically conductive particles comprising at least one of FeP or $Fe_2P$, and a trimodal size distribution of barrier particles comprising talc platelets, mica platelets, barium sulfate, and alumina, the cured coating being formulated to be resistant to corrosion by bio-diesel fuels.

64. A product as set forth in claim 63 wherein the cured coating is a non-foam coating substantially free of bubbles, open cells, and closed cells.

65. A product as set forth in claim 63 wherein the first shell and second shell define a cavity of the tank and further comprising a bio-diesel fuel carried in the cavity of the tank.

66. A coating composition comprising: a phenoxy resin, polyvinyl butyral, a methylethylketoxime blocked toluene diisocyanate, a pH buffer comprising at least one of barium borate or barium metaborate, a first bio-diesel fuel degradation product comprising barium and a second bio-diesel fuel degradation product neutralizing agent comprising di-lauryl-3,3'-thiodipropionate, electrically conductive particles comprising at least one of FeP or $Fe_2P$, and a trimodal size distribution of barrier particles comprising talc platelets, mica platelets, barium sulfate, and alumina.

67. A coating composition comprising: a phenoxy resin, polyvinyl butyral, and a blocked isocyanate, and wherein the phenoxy resin has an average molecular weight ranging from about 10,000 to about 100,000, and wherein the polyvinyl butyral has an average molecular weight ranging from about 10,000 to about 350,000, and a barium compound and a sulfur compound.

* * * * *